United States Patent Office 3,324,001
Patented June 6, 1967

3,324,001
ANALGESIC COMPOSITIONS WHICH CONTAIN
$\Delta^{16}$-5$\beta$-ANDROSTENE-3$\alpha$-OL-11-ONE
Daniel Bertin, Montrouge, and Jacques Perronnet, Paris, France, assignors to Roussel-UCLAF, Paris, France, a corporation of France
No Drawing. Filed May 13, 1965, Ser. No. 455,603
Claims priority, application France, May 22, 1964, 975,520; Aug. 19, 1964, 985,626
14 Claims. (Cl. 167—65)

The present invention relates to $\Delta^{16}$-unsaturated ketones of the androstane series and to the process for the preparation of these compounds and their medical utilization.

In particular the invention relates to 3-OR-$\Delta^{16}$-androstene-11-ones of the general Formula I:

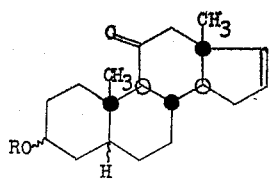

wherein R represents hydrogen, the actyl radical of a therapeutically-compatible organic carboxylic acid, or the acyl radical of a therapeutically-compatible mineral acid and therapeutically-compatible salts thereof; the substituent in the 3 position, occupying either the $\alpha$ or $\beta$ position, and the said compounds may belong to the 5$\beta$ or 5$\alpha$ series.

The compounds, object of the invention, possess interesting physiological properties and may be utilized in particular as analgesics, anticonvulsion and tranquilizing agents.

An object of the present invention is the obtention of a $\Delta^{16}$-androstene of the formula

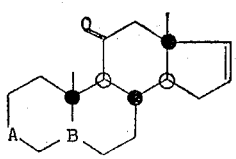

wherein A is selected from the group consisting of C—OR' and C—OR', B is selected from the group consisting of C—H and C—H, and R' is selected from the group consisting of hydrogen, the acyl radical of a therapeutically-compatible organic carboxylic acid having from 1 to 18 carbon atoms and the acyl radical of a therapeutically-compatible inorganic acid.

Another object of the present invention is the obtention of an androstene selected from the group consisting of a compound of the formula

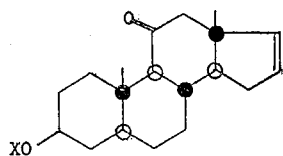

and a compound of the formula

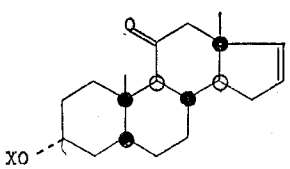

wherein X is a member selected from the group consisting of hydrogen, lower-alkanoyl, carboxy-lower-alkanoyl, alkali metal carboxy-lower alkanoyl, Y SO$_3$- and

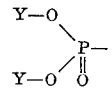

and Y represents a member selected from the group consisting of hydrogen and alkali metal.

A further object of the present invention is the development of a process for the preparation of a $\Delta^{16}$-androstene of the formula

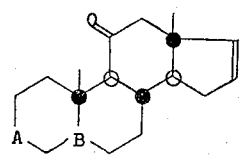

wherein A is selected from the group consisting of C—OR' and C—OR', B is selected from the group consisting of C—H and C—H, and R' is selected from the group consisting of hydrogen, the acyl radical of a therapeutically-compatible organic carboxylic acid having from 1 to 18 carbon atoms and the acyl radical of a therapeutically-compatible inorganic acid, which comprises the steps of selectively reducing the ketone in the 17 position of a compound of the formula

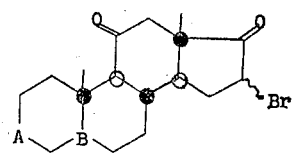

wherein A and B have the above-assigned values, by the action of an alkali metal borohydride in an organic solvent at temperatures below 20° C., reacting the resultant bromohydrin of the formula

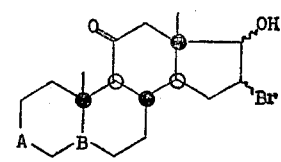

wherein A and B have the above-assigned values, with a reducing metal in an aliphatic alcohol at reflux temperatures and recovering said $\Delta^{16}$-androstene.

A yet further object of the invention is the development of a process of relieving pain and spasms in the warm-blooded animal which comprises administering a dose of between 100 mg. and 2 g. per 70 kilograms of body weight of said warm-blooded animal of a $\Delta^{16}$-androstene of the formula

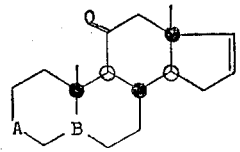

wherein A is selected from the group consisting of C—OR' and C—OR', B is selected from the group consisting of C—H and C—H, and R' is selected from the group consisting of hydrogen, the acyl radical of a therapeutically-compatible organic carboxylic acid having from 1 to 18 carbon atoms and the acyl radical of a therapeutically-compatible inorganic acid.

A still further object of the invention is the obtention of an intermediate, a bromohydrin of the formula

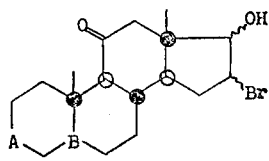

wherein A is selected from the group consisting of C—OR' and C—OR', B is selected from the group consisting of C—H and C—H, and R' is selected from the group consisting of hydrogen, the acyl of a therapeutically-compatible organic carboxylic acid having from 1 to 18 carbon atoms and the acyl of a therapuetically-compatible inorganic acid.

These and other objects of the invention will become more apparent as the description thereof proceeds.

Among the compounds of the invention, $\Delta^{16}$-5$\beta$-androstene-3$\alpha$-ol-11-one and its functional derivatives in the 3 position such as acetate, sulfate and phosphate and the alkali metal salts of the last two, present an even more particular interest.

The process for the preparation of these compounds is summarized in the flow diagram of Table I.

TABLE I

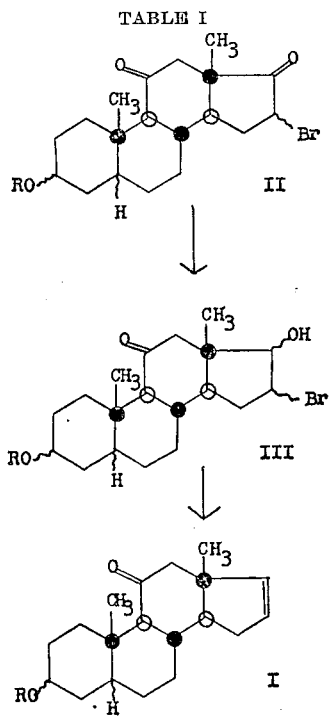

wherein R represents hydrogen, the acyl radical of a therapeutically-compatible organic carboxylic acid, or the acyl radical of a therapeutically-compatible mineral acid and therapeutically-compatible salts thereof; the substituent in the 3 position, occupying either the $\alpha$ or $\beta$ position, and the said compounds may belong to the 5$\beta$ or 5$\alpha$ series.

The process for the production of the $\Delta^{16}$-androstenes of the invention is characterized essentially in that the ketone in the 17 position of a 3$\xi$-OR-16$\xi$-bromo-androstane-11,17-dione, II, R retaining, here as well as in the following, the significance previously mentioned, is selectively reduced by submitting it to the action of an alkali metal borohydride, next the resultant 3$\xi$-OR-16$\xi$-bromo-androstane-17$\xi$-ol-11one, III, is treated to the action of a metal reducing agent such as, for example, zinc, and in this manner a 3$\xi$-OR-$\Delta^{16}$-androstene-11-one, I, is obtained, which, if desired, is converted according to well-known methods into the desired functional derivative.

The selective reduction of the ketone in the 17 position of 3$\xi$-OR-16$\xi$-bromo-androstane-11,17-dione, II, is obtained preferably with the aid of either sodium or potassium borohydride, working in an organic solvent such as the tetrahydrofuran at a low temperature of below 20° C. to about —40° C. and preferably at about —10° C.

The treatment with a metal reducing agent such as powdered zinc of the bromohydrin, 3$\xi$-OR-16$\xi$-bromo-androstane-17$\xi$-ol-11-one, III, may be accomplished in an aliphatic alcohol, preferably a lower alkanol, for example methanol or ethanol, while operating at the reflux temperature of the solvent. Preferably, the product, 3$\xi$-OR-$\Delta^{16}$-androstene-11-one is purified by treating the same with a sulfochromic acid mixture in an inert solvent.

The following examples will serve for better comprehension of the invention without limiting its characteristics.

PREPARATION

*3$\alpha$-acetoxy-16$\xi$-bromo-5$\beta$-androstane-11,17-dione*

[II, R=—COCH$_3$]

Under agitation 10 g. of 3$\alpha$-acetoxy-5$\beta$-androstane-11,17-dione were dissolved in 50 cc. of chloroform. Several drops of hydrobromic acid were added thereto, then, within a space of 10 minutes, 51 cc. of a solution of 10 g. of bromine in 100 cc. of chloroform were introduced. After the addition, the agitation was continued for a few minutes more, then the reaction mixture was poured into water containing several cc. of a sodium bisulfite solution.

The reaction mixture was extracted with chloroform. The organic phase was washed first with sodium bicarbonate solution until the wash waters were neutral, then with an aqeuous solution of sodium chloride. The organic phase was then dried, filtered and evaporated to dryness, and a resin was obtained which was crystallized from methanol.

The methanolic mixture was iced and the crystals were vacuum filtered. 9.37 g., that means a yield of 76%, of 3$\alpha$-acetoxy - 16$\xi$ - bromo-5$\beta$-androstane-11,17-dione (II, R=—COCH$_3$), were obtained having a melting point of 218°–219° C. and a specific rotation [$\alpha$]$_D^{20}$=+118°±1° (c.=1% in chloroform).

The compound is colorless and insoluble in water, dilute aqueous acids and alkalis, slightly soluble in alcohol, and soluble in chloroform.

*Analysis.*—C$_{21}$H$_{29}$O$_4$Br; molecular weight=425.36. Calculated: C, 59.29%; H, 6.87%; Br, 18.79%. Found: C, 59.2%; H, 6.8%; Br, 18.6%.

In a similar manner, starting with 3$\beta$-acetoxy-5$\alpha$-androstane-11,17-dione, 3$\beta$-acetoxy - 16$\xi$ - bromo-5$\alpha$-androstane-11,17-dione (II, R=COCH$_3$), was prepared, having a melting point of 183°–185° C. and a specific rotation [$\alpha$]$_D^{20}$=+125° (c.=1.06% in chloroform).

EXAMPLE I

*Preparation of $\Delta^{16}$-5$\beta$-androstene-3$\alpha$-ol-11-one*

[I, R=H]

STEP A.—3$\alpha$-ACETOXY-16$\xi$-BROMO-5$\beta$-ANDROSTANE-17$\xi$-OL-11-ONE (III, R=—COCH$_3$)

4.25 gm. of 3$\alpha$-acetoxy-16$\xi$-bromo-5$\beta$-androstane-11,17-dione, (II, R=—COCH$_3$) were dissolved in 76 cc. of anhydrous tetrahydrofuran. 8.5 cc. of water were added thereto and the solution was cooled to about —10° C. 0.38 gm. of sodium borohydride were added to the cooled solution and the reaction mixture was agitated while cooling for a period of 20 minutes. Then, the mixture was neutralized by adding 1.5 cc. of acetic acid and poured into water.

The reaction mixture was extracted with chloroform. The organic phase was washed with an aqueous solution of sodium chloride, dried and evaporated to dryness. A quantitative yield of 3$\alpha$-acetoxy - 16$\xi$ - bromo-5$\beta$-androstane-17$\xi$-ol-11-one (III, R=—COCH$_3$) were obtained, which compound was utilized as such for the next step of the preparation.

This compound is not described in the literature.

STEP B.—3α-ACETOXY-Δ¹⁶-5β-ANDROSTENE-11-ONE
(I, R=—COCH₃)

7 gm. of 3α-acetoxy-16ξ-bromo-5β-androstane-17ξ-ol-11-one, (III, R=—COCH₃), were dissolved in 300 cc. of 95% ethanol. 30 gm. of zinc powder were added to the solution, and the reaction mixture was heated at reflux for a period of 4 hours. The mixture was then filtered to separate the zinc. The filtrate was evaporated to dryness and the residue was dissolved in methylene chloride.

The methylene chloride solution was washed with an aqueous solution of sodium chloride, dried and evaporated to dryness. A resin was obtained which was crystallized by trituration in hot methanol. Thereafter, the product was recrystallized from ethyl acetate and 1.94 gm. of product was obtained which was purified by treating it with a sulfochromic acid mixture, working in the following manner:

1.9 gm. of the crystallized product obtained was dissolved in 22 cc. of acetone and 0.3 cc. of a sulfochromic acid mixture was added. This sulfochromic acid mixture was prepared from chromic acid anhydride—27 gm.
sulfuric acid—23 cc.

and water in sufficient quantity to obtain 100 cc. of mixture and the mixture was agitated for several minutes.

After the addition of 0.3 cc. of methanol, the reaction mixture was poured into water. The precipitate was vacuum filtered, washed with water until the wash waters were neutral, and finally dried. In this manner 1.815 gm., being a yield of 33%, of 3α-acetoxy-Δ¹⁶-5β-androstene-11-one, I, R=—COCH₃), were obtained, having a melting point of 144° C., and a specific rotation $[\alpha]_D^{20} = +100° \pm 1°$ (c.=0.9% in chloroform).

The product is colorless, insoluble in water, slightly soluble in methanol, soluble in chloroform and ethyl acetate.

Analysis.—$C_{21}H_{30}O_3$; molecular weight=330.45. Calculated: C, 76.32%; H, 9.15%. Found: C, 76.4%; H, 9.2%.

This compound is not described in the literature.

STEP C.—Δ¹⁶-5β-ANDROSTENE-3α-OL-11-ONE (I, R=H)

1.8 gm. of 3α-acetoxy-Δ¹⁶-5β-androstene-11-one, (I, R=—COCH₃) were placed in suspension in 36 cc. of methanol. 1 cc. of sodium hydroxide solution was added thereto and the reaction mixture was agitated at room temperature over a period of 2 hours. The mixture was next neutralized by the addition of acetic acid. Next, water was added and the mixture was again agitated for 30 minutes. The precipitate was vacuum filtered, washed with water and dried. The product recovered was recrystallized from isopropyl ether.

0.883 gm., being a yield of 57%, of Δ¹⁶-5β-androstene-3α-ol-11-one (I, R=H), was obtained, having a melting point of 146° C. and a specific rotation $[\alpha]_D^{20} = +84° \pm 1°$ (c.=1% in chloroform).

The product is colorless and insoluble in water and in aqueous acids and alkalis, slightly soluble in isopropyl ether, quite soluble in ethanol and soluble in chloroform.

Analysis.—$C_{19}H_{28}O_2$; molecular weight=288.14. Calculated: C, 79.12%; H, 9.79%. Found: C, 78.9%; H, 9.7%.

This compound is not described in the literature.

In an analogous manner, starting out with 3β-acetoxy-16ξ-bromo-5α-androstane-11,17-dione (II, R=—COCH₃)

first 3β-acetoxy-16ξ-bromo-5α-androstane-17ξ-ol-11-one (III, R=—COCH₃), was prepared, this compound not being described in the literature, and next 3β-acetoxy-Δ¹⁶-5α-androstene-11-one and Δ¹⁶-5α-androstene-3β-ol-11-one were prepared, which compounds are likewise not described in the literature. These new compounds were converted, if desired, into the desired functional derivatives according to well known processes.

EXAMPLE II

Preparation of the 3α-sodiumoxysulfonyloxy-Δ¹⁶-5β-androstene-11-one

[I, R=—SO₃Na]

Under an atmosphere of nitrogen and under agitation, a 2 gm. of Δ¹⁶-5β-androstene-3α-ol-11-one (I, R=H) were dissolved in 16 cc. of chloroform and 10 cc. of anhydrous pyridine. The solution was cooled to 0° C. and slowly 10.5 cc. of a chloroform solution containing 4.32 gm. of chlorosulfonic acid per 50 cc. of solution were added. The reaction mixture was kept under an atmosphere of nitrogen and at room temperature for a period of 12 hours, then it was diluted with chloroform. A saturated aqueous solution of sodium chloride was added and the mixture was concentrated under vacuum at a temperature of about 25–27° C. The crystals formed after the evaporation of the chloroform were vacuum filtered and dried under vacuum. By recrystallization from water and drying under vacuum, 1.850 gm. of the desired product, 3α-sodiumoxysulfonyloxy-Δ¹⁶-5β-androstene-11-one (I, R=—SO₃Na)

were obtained, having a melting point towards 210° C. and a specific rotation $[\alpha]_D^{20} = +88.4°$ (c.=1% in water).

The product is soluble in the alcohols, ether, benzene and ethyl acetate, soluble to 10% in water, and slightly soluble in chloroform.

Analysis.—$C_{19}H_{27}O_5SNa$; molecular weight=390.48. Calculated: C, 58.43%; H, 6.97%; S, 8.21%; Na, 5.89%. Found: C, 58.2%; H, 7.00%; S, 8.2%; Na, 6.1%.

This compound is not described in the literature.

EXAMPLE III

Preparation of the acid monophosphate ester of Δ¹⁶-5β-androstene-3α-ol-11-one

[I, R=—PO₃H₂]

Under atmosphere of nitrogen, 7 gm. of Δ¹⁶-5β-androstene-3α-ol-11-one (I, R=H), were dissolved in 300 cc. of anhydrous ether and 30 cc. of pyridine. Next, the solution was cooled under agitation to −15° C., and a solution of 3 cc. of phosphorous oxychloride in 150 cc. of ether was slowly introduced. The agitation was continued for a further 2 hours at about −15° C., then the temperature of the reaction mixture was allowed to rise to 25–28° C., and under agitation this temperature was maintained for 4 hours. Next, 500 cc. of an ice/water mixture was added and the mixture was agitated for about 1 hour. Then the mixture was allowed to stand in the cold for a period of 12 hours. Thereafter, 100 cc. of an aqueous normal sodium hydroxide solution were added. The aqueous phase was decanted after agitation. The ethereal phase was extracted with 100 cc. of an aqueous normal sodium hydroxide solution. The combined aqueous extracts were washed with ether and acidified with an aqueous normal hydrochloric acid solution. The crystals thus formed were vacuum filtered, washed with water and dried under vacuum. 8.515 gm. of the desired raw acid monophosphate ester of the steroid were obtained.

This product was purified by placing it in suspension in water, then by adding an aqueous normal solution first of sodium hydroxide and then, after filtration, of hydrochloric acid. The product was vacuum filtered and recrystallized from ether containing n-hexane, 2.21 gm. of the pure acid monophosphate ester of Δ¹⁶-5β-androstene-3α-ol-11-one (I, R=—PO₃H₂) were obtained, having a melting point of 210° C. and a specific rotation $[\alpha]_D^{20} = +85.9°$ (c.=1% in methanol).

The product is soluble in alcohols, ether, acetone, benzene and chloroform and insoluble in water.

*Analysis.*—$C_{19}H_{29}O_5P$; molecular weight=368.4. Calculated: C, 61.94%; H, 7.93%; P, 8.41%. Found: C, 62.2%; H, 7.9%; P, 8.5%.

This compound is not described in the literature.

As it was indicated above, the new compounds of the general Formula I are endowed with interesting phamacological properties. In particular, they possess a depressive neurotrophic action on the central nervous system.

More particularly yet, the compounds of Formula I and in particular $\Delta^{16}$-5β-androstene-3α-ol-11-one and its therapeutically compatible organic acid esters or mineral acid esters and the alkali metal salts of the latter, may have utility in warm-blooded animals for the treatment of neurotic conditions and of insomnia, of nervous detpressions, of overexertion, of spasms, of neuroses or all manifestations of irritability, anguish or neurosis.

In addition, they possess depressive properties on the medullary centers, causing muscular relaxation during the seizures of contraction, and attenuating cramps, myalgia and muscular stiffness.

They may have utility as anticonvulsive agents in petit mal. They may be utilized orally, subcutaneously or rectally.

The compounds of the invention may be prepared in the form of injectable solutions or suspensions, prepared in ampoules or in multiple does phials; in the form of tablets, coated tablets or suppositories.

The useful dosology is controlled between 100 mg. and 2 gm. per 70 kilograms of body weight per day in warm-blooded animals as a function of the method of administration.

The phamaceutical forms such as injectable solutions or suspensions, tablets, coated tablets and suppositories are prepared according to the usual processes.

EXAMPLE IV

*Pharmacological study of the compounds of the invention*

(1) *Determination of the sedative effect.*—$\Delta^{16}$-5β-androstene-3α-ol-11-one (I, R=H), in aqueous suspension, was administered in the form of intraperitoneal injections to groups of 10 mice each, in doses of 10, 20, 50, 100 and 500 mg./kg. A sedative effect on the central nervous system was noted which was accentuated with the increase of the doses and terminated in a narcotic effect.

At doses of 10 and 20 mg./kg., a weak sedative effect was manifested by a hypotonicity. At a dose of 50 mg./kg. the effect was more intense with a temporary loss of the grip reflex and impossibility to climb a plane inclined at 70°. The narcotic effect was manifested at a dose of 100 mg./kg., where 6 out of 10 mice lost the straightening reflex for a period of 45 minutes. At a dose of 500 mg./kg. the narcotic effect was of longer duration but no mortality at all was observed. At prenarcotic doses, the depressor effect appeared 10 minutes after the injection and lasted about 2 hours. At narcotic doses, sleep was tranquil, without any pre-anesthetic agitation and with pronounced muscular relaxation.

(2) *Determination of the anticonvulsive effect; convulsions produced by pentylenetetrazol.*—Groups of 10 female mice each were utilized. The product under study, in suspension in an aqueous dispersive liquid, was injected intraperitoneally, at doses of 10, 20 and 50 mg./kg. The control group received only the dispersive.

One-half hour after the injection, a solution of pentylenetetrazol in physiologic serum at a concentration of 3 mg./cc. was perfused in the mice intravenously.

During the course of the perfusion, the progress of intoxication was characterized by the following three criteria:

(1) Threshold of the convulsive effect (myoclony of the ears).

(2) Clonic crisis.

(3) Tonic crisis with apnea and generally followed by death.

The doses of pentylenetetrazol corresponding to these effects were recorded. Table II following summarizes the results.

TABLE II

| | Doses Administered, mg./kg. | Dose of pentylenetetrazol in mg./kg. | | |
|---|---|---|---|---|
| | | Movement of the ears | Clonic crisis | Tonic crisis |
| Controls | 0 | 33 | 40 | 66.4 |
| $Z^{16}$-5β-androstene-3α-ol-11-one | 10 | 36.1 | 43.4 | 107 |
| | 20 | 51.5 | 57.2 | >129.5 |
| | 50 | 86.7 | 96 | 141 |

On the other hand, the duration of the effect of the product administered at a dose of 50 mg./kg., 30 minutes, 1, 2 and 4 hours prior to the pentylenetetrazol, was studied. The results obtained are shown in Table III.

TABLE III

| | Dose, mg./kg. | The time from which the product was administered prior to the pentylenetetrazol | Doses of pentylenetetrazol in mg./kg. | | |
|---|---|---|---|---|---|
| | | | Movement of the ears | Clonic crisis | Tonic crisis |
| Control | 0 | | 37.9 | 43.8 | 72.8 |
| $\Delta^{16}$-5β-androstene-3α-ol-11-one | 50 | 30 min | 91.0 | 108.9 | 166 |
| | | 1 hr | 56.1 | 63.0 | 131.4 |
| | | 2 hrs | 41.8 | 50.0 | 82.3 |
| | | 4 hrs | 42 | 50.8 | 94.7 |

Therefore, according to the above results, it can be noted that $\Delta^{16}$-5β-androstene-3α-ol-11-one, injected intraperitoneally 30 minutes before the test, acts already at a dose of 10 mg./kg. on the tonic crisis. The dose of 20 mg./kg. delayed in a considerable manner the appearance of the first convulsive movements, and at this dose, the tonic crisis did not systematically cause death as it did in the control animals. At this dose, there is, therefore, about 40% protection.

From the total of these tests, it follows that $\Delta^{16}$-5β-androstene-3α-ol-11-one possesses an extended range of neurosedative effects and a good therapeutic margin, since, intraperitoneally, it is not toxic to mice at a dose of 500 mg./kg.

The other compounds of general Formula I give comparable results.

The preceding specific embodiments are illustrative of the invention. It is obvious however that other expedients known to those skilled in the art may be employed without departing from the spirit of the invention or the scope of the appended claims.

We claim:
1. An androstene selected from the group consisting of a compound of the formula

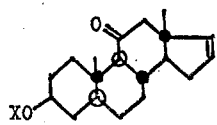

and a compound of the formula

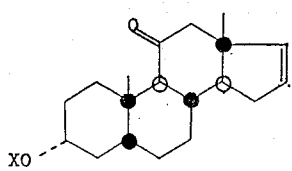

wherein X is a member selected from the group consisting of hydrogen, lower-alkanoyl, carboxy-lower-alkanoyl, alkali metal carboxy-lower-alkanoyl, Y—SO₃— and

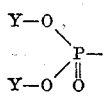

and Y represents a member selected from the group consisting of hydrogen and alkali metal.

2. 3α-acetoxy-Δ¹⁶-5β-androstane-11-one.
3. 3α - sodiumoxysulfonyloxy - Δ¹⁶ - 5β-androstene-11-one.
4. The acid monophosphate ester of Δ¹⁶-5β-androstene-3α-ol-11-one.
5. 3β-acetoxy-Δ¹⁶-5α-androstene-11-one.
6. A bromohydrin selected from the group consisting of a compound of the formula

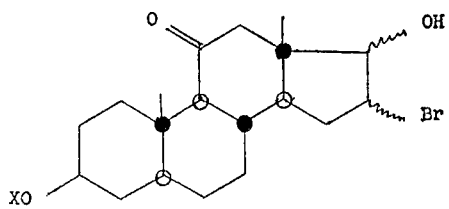

and a compound of the formula

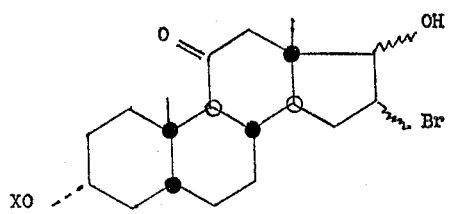

wherein X is a member selected from the group consisting of hydrogen, lower-alkanoyl, carboxy-lower-alkanoyl, alkali metal carboxy-lower-alkanoyl, YSO₃— and

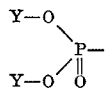

and Y represents a member selected from the group consisting of hydrogen and alkali metal.

7. 3α-acetoxy-16ξ-bromo-5β-androstane-17ξ-ol-11-one.
8. 3β-acetoxy-16ξ-bromo-5α-androstane-17ξ-ol-11-one.
9. A process for the preparation of an androstene selected from the group consisting of a compound of the formula

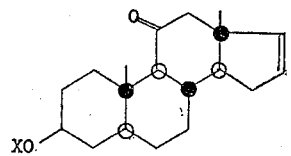

and a compound of the formula

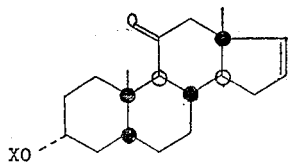

wherein X is a member selected from the group consisting of hydrogen, lower-alkanoyl, carboxy-lower-alkanoyl, alkali metal carboxy-lower-alkanoyl, YSO₃— and

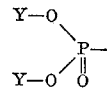

and Y represents a member selected from the group consisting of hydrogen and alkali metal, which comprises the steps of selectively reducing the ketone in the 17 position of a compound selected from the group consisting of a compound of the formula

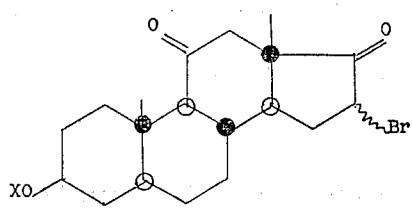

and a compound of the formula

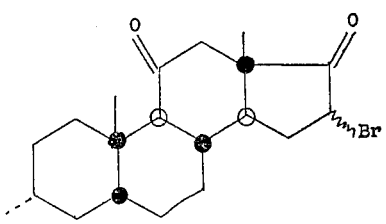

wherein X has the above-assigned values, by the action of an alkali metal borohydride in an organic solvent at temperatures below 20° C., reacting the resultant bromohydrin selected from the group consisting of a compound of the formula

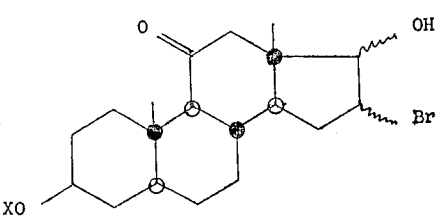

and a compound of the formula

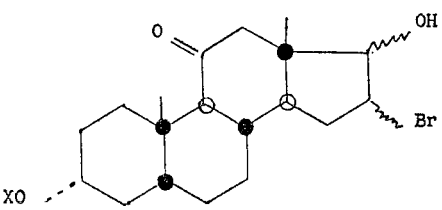

wherein X has the above-assigned values, with a reducing metal in an aliphatic alcohol at reflux temperatures, and recovering said androstene.

10. The process of claim 9 wherein said selectively reducing step is by the action of sodium borohydrin in tetrahydrofuran at about −10° C.

11. The process of claim 9 wherein said reducing metal is zinc powder and said aliphatic alcohol is a lower alkanol.

12. The process of claim 9 wherein said $\Delta^{16}$-androstene is purified by contacting with a sulfochromic acid mixture in a solvent.

13. A therapeutic composition comprising a minor amount of an androstene selected from the group consisting of a compound of the formula

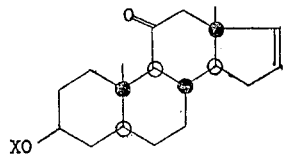

and a compound of the formula

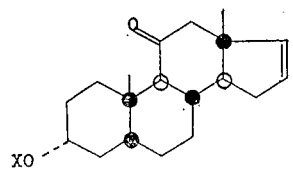

wherein X is a member selected from the group consisting of hydrogen, lower-alkanoyl, carboxy-lower-alkanoyl, alkali metal carboxy-lower-alkanoyl, YSO$_3$— and

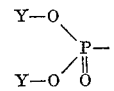

and Y represents a member selected from the group consisting of hydrogen and alkali metal, and a major amount of an inert pharmaceutical media.

14. A process of relieving pain and spasms in the warm-blooded animal which comprises administering a dose of between 100 mg. and 2 g. per 70 kilograms of body weight of said warm-blooded animal of an androstene selected from the group consisting of a compound of the formula

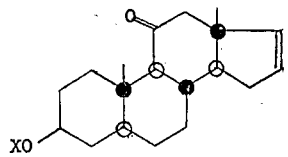

and a compound of the formula

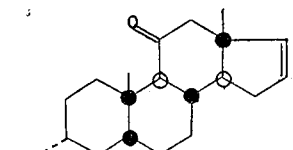

wherein X is a member selected from the group consisting of hydrogen, lower-alkanoyl, carboxy-lower-alkanoyl, alkali metal carboxy-lower-alkanoyl, YSO$_3$— and

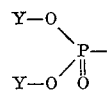

and Y represents a member selected from the group consisting of hydrogen and alkali metal.

No references cited.

LEWIS GOTTS, *Primary Examiner.*

ELBERT L. ROBERTS, *Examiner.*